United States Patent
Salas Huenuleo et al.

(10) Patent No.: US 12,349,680 B2
(45) Date of Patent: Jul. 8, 2025

(54) MULTIPURPOSE PRODUCT WITH PROLONGED ANTIMICROBIAL ACTION AND METHOD OF PRODUCING

(71) Applicant: ADVANCED INTEGRATED TECHNOLOGIES SpA, Huechuraba (CL)

(72) Inventors: Edison Salas Huenuleo, Huechuraba (CL); Rodrigo Torres de la Fuente, Huechuraba (CL); Nicolas Wainstein Messing, Huechuraba (CL); Tomas Federico Houdely Saieg, Huechuraba (CL)

(73) Assignee: ADVANCED INTEGRATED TECHNOLOGIES SpA (CL)

( * ) Notice: Subject to any disclaimer, the term of this patent is extended or adjusted under 35 U.S.C. 154(b) by 485 days.

(21) Appl. No.: 17/710,744

(22) Filed: Mar. 31, 2022

(65) Prior Publication Data
US 2023/0043126 A1 Feb. 9, 2023

(30) Foreign Application Priority Data
Feb. 4, 2021 (CL) .............................. CL 0303-2021

(51) Int. Cl.
*A01N 59/20* (2006.01)
*A01N 25/04* (2006.01)
*A01N 33/12* (2006.01)
*A01P 1/00* (2006.01)

(52) U.S. Cl.
CPC .............. *A01N 59/20* (2013.01); *A01N 25/04* (2013.01); *A01N 33/12* (2013.01); *A01P 1/00* (2021.08)

(58) Field of Classification Search
CPC ........ A01N 59/20; A01N 33/12; A01N 25/04; A01P 1/00
See application file for complete search history.

(56) References Cited

FOREIGN PATENT DOCUMENTS

WO 2012018888 * 2/2012

OTHER PUBLICATIONS

Sarcina et al, Cu-Nanoparticle Loaded Nanovesicles with Anti-Biofilm Properties. Part I: Synthesis of New Hybrid Nanostructures, 10, 1542. (Year: 2020).*

* cited by examiner

*Primary Examiner* — Carlos A Azpuru
(74) *Attorney, Agent, or Firm* — Patenting Consulting Group; Roberto J Rios

(57) ABSTRACT

Multipurpose product with prolonged antimicrobial action comprising at least one quaternary ammonium and copper nanoparticles in non-oxidized metallic state ($Cu^0$), where copper nanoparticles in non-oxidized metallic state ($Cu^0$) are found nucleated in at least one quaternary ammonium. A method for producing a multipurpose product with prolonged antimicrobial action.

15 Claims, No Drawings

MULTIPURPOSE PRODUCT WITH PROLONGED ANTIMICROBIAL ACTION AND METHOD OF PRODUCING

The present invention patent application consists in multipurpose disinfectant cleaning product with prolonged residual action, which allows the surface to remain protected from the biocidal activity for a long time, composed of at least one quaternary ammonium and copper nanoparticles. Specifically, the product is composed of physicochemically stable copper nanoparticles in the non-oxidized metallic state ($Cu^0$) in combination with at least one quaternary ammonium, achieving a product derived from a highly innovative chemical reaction.

PREVIOUS ART

In the market, it is possible to observe a moderate variety of cleaning products that incorporate copper nanoparticles in their composition. Today, having disinfectant cleaning products that also can leave all types of surfaces and environments protected over time after the application of the product, has become highly relevant since the appearance of SARS-CoV-2 and the global context, one of the most important pandemics of the last century. It has been described that one of the most important routes of contagion is the indirect route, mediated by contact with surfaces contaminated with the virus, so the disinfection of surfaces and environments is essential as a prophylaxis and prevention measure. In the current market, there are various disinfectant alternatives, however, there are no disinfectant products with long-term action effects that allow surfaces to be protected over time. These technological developments are considered highly innovative and relevant in disease prevention. Likewise, due to its effect that remains over time, they deliver a friendly component to the environment due to the continuous decrease in its use. Therefore, products with these characteristics are differentiable and superior to those already on the market.

For example, WO 2013/057037 A1 describes a hard surface cleaning composition comprising:
a. 0.1-2.5% of a polyvalent metal salt;
b. 0.25-5% of a fluorosilane;
c. 0.25-2.5% of a cationic surfactant;
d. 3.5-8.5% of a lower alcohol solvent; and
e. 0.5-6% of a co-solvent; and where the composition has a pH between 3 and 7, and where the composition is substantially free of alkaline earth metals.

Polyvalent metal salts are selected from metal salts including zinc, copper, aluminum, iron, or titanium. The fluorosilane is selected from a group comprising, among others, "cetyltrimethylammonium bromide". Unlike the invention, fluorosilane is not a surfactant, it is an agent that binds to surfaces such as glass, providing the characteristic of repellency. The document covers metal salts, including copper salts, not copper nanoparticles. In addition, although it indicates that one of its fundamental components is cationic quaternary ammonium, it specifies that the choice is benzalkonium chloride.

For its part, document WO 2012018888 describes a liquid antiseptic formulation, a method of use, and a method for preparing the formulation. It comprises chelated metal ions and a fixing polymer called polyquaternium-69 that has the ability to bind chelated metal ions and other types of antimicrobial agents, with the ability to bind excess chelated ions left on the skin for hours or days. Polyquaternium-69 is a polymeric quaternary ammonium salt composed of vinyl caprolactam, vinylpyrrolidone, dimethylaminopropyl methacrylamide (DMAPA), and methacryloylaminopropyl chloride lauryldimonium. It further comprises a surface-active agent, a gelling agent, Irgasan DP 300 USP, also thymol, chlorhexidine gluconate, benzalkonium chloride, cetyltrimethylammonium bromide, cetylpyridinium chloride, and benzethonium chloride. This document describes the possible agents that an antiseptic formulation may contain and notes that it may contain chelated copper or silver ions, or quaternary ammoniums such as cetyltrimethylammonium bromide. However, in the formulations described and claimed in this document, it is described that the use of the product is on the skin of people and not for inorganic surfaces as declared by the present invention, they use polyquaternium-69 and silver as quaternary ammonium, chelated in the form of citrate.

Most commercial detergents and disinfectants, both for home use and for industrial or clinical use, have antimicrobial activity at the time of application, however, they do not have a residual antimicrobial effect that protects over time (days or weeks). Because of this, microorganisms can unimpededly proliferate on surfaces after the use of these cleaning items, which can lead to health problems in certain circumstances. This has led to the adoption of strict cleaning protocols in some industries, such as the food industry or in clinics and hospitals, to reduce the chances of pathogenic microorganisms proliferating or being inoculated by exposure to surfaces. However, the occurrence of microbiological contamination in these industries is frequent and incipient, so it remains a latent problem.

In this way, having a product that, in addition to providing disinfection at the time of application, provides antimicrobial protection over time, reduces the probability of microbial contamination on surfaces, helping to prevent and reduce the transmission of diseases in the population, such as, for example, exposure to pathogenic bacteria from food, such as *Listeria monocytogenes* or *Salmonella enteritidis*, as well as the transmission of nosocomial pathogens in health services, or in the current context, the indirect transmission of the SARS-CoV2.

There are some developments of industrial detergents that claim long-term action. However, the effect and mechanism is different. In the market there are products that contain surfactant agents that act at the moment, together with the presence of non-pathogenic microorganisms that generate the long-term effect, these microorganisms present in these products compete for the environment and nutrients, eliminating other pathogenic microorganisms and non-pathogenic, they eliminate odors through biological degradation and by controlling microbiological dispersion. However, these products are focused on certain specific industrial processes, the antimicrobial action is also directed against specific microorganisms, and their action over time is limited.

The copper nanoparticles present in the product of the invention are in a metallic state, that is, a crystalline structure with a zero oxidation state ($Cu^0$). Once deposited on the surface, the nanoparticles generate action through microbial oxidation mechanisms when facing various microorganisms, such as bacteria, fungi and viruses, constantly releasing copper ions into the environment, affecting biological membranes and their integrity.

The product described here corresponds to a multipurpose disinfectant cleaner with prolonged residual action, that is, a single application of the product (without replication) allows the surface to remain protected with biocidal activity for at least 7 days.

In addition to its prolonged residual action, the multipurpose disinfectant cleaning product has an antimicrobial effect that is achieved with a concentration of nanoparticles infinitely lower than what is known, in some cases with concentrations ten thousand times lower than the concentrations known in the state of the art. In the same way, the present invention describes proven viricidal and fungicidal activity of the multipurpose product, which represents an important technical advantage with respect to what is known in the state of the art.

Finally, the intrinsic physicochemical properties of the nanoparticles that are achieved by the manufacturing process of the multipurpose product, such as their size, crystalline characteristics and surface charge, mean that it is not necessary to incorporate other substances into the multipurpose product, such as excipients, such as gelling agents, stabilizers, etc., which only reduce the bactericidal, virucidal and fungicidal potential of the product and its cleaning power.

In view of the above, the present application is also related to a process for the production of copper nanoparticles ($Cu^0$) in a surfactant matrix that generates nanoparticles with differentiated physicochemical characteristics, such as: stability, controlled release of $Cu^{2+}$, antimicrobial action, detergency and colloidal suspension.

DESCRIPTION OF THE INVENTION

The present invention consists of a multipurpose disinfectant cleaner product with antimicrobial action, that is, antibacterial, virucidal, fungicidal and prolonged residual yeasticide, composed of at least one quaternary ammonium and copper nanoparticles in non-oxidized metallic state ($Cu^0$), where copper nanoparticles in non-oxidized metallic state ($Cu^0$) are nucleated in at least one quaternary ammonium matrix, and where the nanoparticles have the following physicochemical properties:
  a. Spherical morphology
  b. Size distribution of <0.3 IPD (polydispersity index)
  c. Surface charge of <50 mV (milliVolts)
  d. Face-centered cubic (FCC) Bravais lattice crystal structure
  e. Oxidation state equal to 0 (zero)
  f. Purity>99%

Where said at least one quaternary ammonium is in a concentration of between 1-10,000 ppm (0.0001-1% w/v) and said copper nanoparticles in non-oxidized metallic state) ($Cu^0$) are in a concentration of between 0.001-100 ppm (0.0000001-0.01% w/v), preferably said at least one quaternary ammonium is in a concentration of between 100-2000 ppm (0.01-0.2% w/v) and said nanoparticles of copper in non-oxidized metallic state ($Cu^0$) are in a concentration between 1-10 p pm (0.0001-0.001% p/v).

The product is the result of a delicately regulated production process, where copper nanoparticles are synthesized in a quaternary ammonium surfactant matrix, which can be sodium dodecyl sulfate, sodium lauryl sulfate, benzalkonium chloride, benzethonium chloride, N bromide, N,N-trimethylhexadecane-1-aminium, cetylpyridinium chloride, ketalkonium chloride, N,N,N-trimethylhexadecane-1-aminium chloride, methylbenzethonium chloride, didecyldimethylammonium chloride, tetraethylammonium bromide, cetylpyridinium chloride, at therefore, it is not a simple mixture of active agents, but rather a highly innovative chemical reaction product. Physicochemically stable copper nanoparticles are present in its composition, in terms of size dispersion and its maintenance, surface charge, crystalline structure, oxidation state and purity, with a size between 0.5-5000 nm, preferably a size between 0.5 and 5 nm, in non-oxidized metallic state ($Cu^0$). The density of the product comprises between 0.9 and 1.1 g/mL and the pH between 5 and 8 measured at 25° C. The product has a high capacity for detergency and removal of visible organic dirt and grease.

This effect is due to the surfactant capacity of quaternary ammonium. Likewise, quaternary ammonium instantly exerts broad-spectrum antibacterial, antifungal and antiviral effects, demonstrated by scientific literature. The disinfectant antimicrobial action includes the elimination of at least 99.999% of the tested microorganisms. The sanitizing antimicrobial action, meanwhile, includes the elimination of at least 99.9% of the tested microorganisms. Finally, the sanitizing antimicrobial action, in turn, includes the elimination of at least 99.9% of the tested microorganisms.

In summary, amphiphilic chemical structure, that is, a structure that has a hydrophilic end and another hydrophobic end, the alkyl chain and net positive charge, quaternary ammonium has a disruptive effect on the plasma membrane of Gram (+) bacteria.) and Gram (−), of fungi and yeasts, as well as the membranous envelope and/or the protein capsid of viruses. Additionally, the nanoparticles present in its composition have the ability to attack bacteria, fungi, yeasts and viruses through oxidative reactions derived from the controlled release of $Cu^{2+}$ ions, generating free radicals, affecting cellular, metabolic and structural processes. According to the state of the art, copper nanoparticles have demonstrated effects on bacteria, fungi and viruses. Its action in the product is to deliver an antimicrobial effect with prolonged residual action. Being of such small dimensions, these nanoparticles have a high surface area, so that most of their mass appears as a surface. This effect causes the nanoparticles to adhere easily to the surfaces where the product is applied, generating an antimicrobial effect that lasts over time, like a "protective film". The disinfectant effect that the product leaves on surfaces has been demonstrated for at least 7 days from the application of the product. Likewise, the reduction of the microbial load has been evidenced at least up to 1 week from the application on high-traffic surfaces, in tests carried out on public transport buses and surfaces of massive shopping centers.

The product of the invention is obtained through a process of chemical reduction of copper salts by means of specific reducing agents, controlled temperature, pH and concentration of reactants. The reaction takes place in a continuous flow reactor that delivers energy for the redox reaction to take place, the copper present in its oxidized form is reduced until the formation of metallic copper, generating a continuous nucleation process, where the cationic copper is reduced and deposits on the surface of this core, obtaining stable nanoparticles, with sizes ranging from 0.5 to 5000 nm, preferably between 0.5 and 5 nm. The surfactant facilitates the nucleation process, providing molecular confinement for the reaction to take place, controlling the shape, size and colloidal dispersion of the nanoparticles.

The process is carried out through the following stages:
  i) The reducing agents are prepared using water selected from osmotized, distilled, bidistilled, deionized, or ultrapure type I or type II water. Reducing agents may include: hydrazine, sodium borohydride and carboxylic acids, organic, carbohydrates, including lactic acid, formic acid, citric acid, oxalic acid, malic acid, benzoic acid, ascorbic acid, glucose, fructose, maltose, among others. The concentrations used may vary, depending on the reactant used, in proportions of 1:1-1:100 by mass, preferably in proportions of 1:1-1:10 by mass, with respect to the agent to be reduced and the reducing agent.

ii) The copper salt is prepared using water selected from osmosis, distilled, double-distilled, deionized or ultrapure type I or type II water, which may be: copper chloride (I) or (II), copper sulfate mono, di, tri or penta hydrate, copper acetate, copper (I) or (II) oxide, copper sulfide, copper bromide, copper (I) or (II) hydroxide, copper hydride, copper carbonate, 4,8-diacetyl-2,9a-dimethyl-7,9-dioxodibenzofuran-1,3-copper diolate (copper usnate), among others, according to the proportion indicated above.

iii) Adjust the pH of the reducing solution with a buffer solution between 5-10.

iv) Add to the copper salt solution, the surfactant agent prepared with water selected from osmosis, distilled, bidistilled, deionized, or ultrapure type I or type II water, the surfactant agent being: sodium dodecyl sulfate, lauryl sulfate sodium, benzalkonium chloride, benzethonium chloride, N,N,N-trimethylhexadecane-1-aminium bromide, cetylpyridinium chloride, ketalkonium chloride, N,N,N-trimethylhexadecane-1-aminium chloride, methylbenzethonium chloride, didecyldimethylammonium chloride, tetraethylammonium bromide, cetylpyridinium chloride or a mixture thereof, preferably being cationic quaternary ammoniums.

v) By means of pipes, both reacting solutions are passed until they come together in a "Y" type structure to be previously mixed.

vi) Subsequently, they enter a reactor based on the application of heat energy with localized direction towards the reaction pipes. In the reactor there is a residence time of 1-30 minutes, preferably between 1-12 min, where the redox reaction occurs and copper nanoparticles are formed.

vii) The final product of the reaction is received in polypropylene containers, where it is stored until it is packaged.

Component Proportions:

1-10,000 ppm (0.0001-1% w/v) of at least one quaternary ammonium, preferably between 100-2000 ppm (0.01-0.2% w/v).

0.001-100 ppm (0.0000001-0.01% w/v) of copper nanoparticles, preferably between 1-10 ppm (0.0001-0.001% w/v).

According to the above, the present invention is related to a multipurpose product with prolonged antimicrobial action, comprising at least one quaternary ammonium and copper nanoparticles in non-oxidized metallic state ($Cu^0$), where the copper nanoparticles in metallic state non-oxidized ($Cu^0$) are nucleated in at least one quaternary ammonium, where the nanoparticles comprise the following physicochemical properties:

i. spherical morphology;
ii. B. size distribution of <0.3 polydispersity index (PDI);
iii. C. surface charge of <50 milliVolts (mV);
iv. D. Bravais red face-centered cubic (FCC) crystal structure;
v. me. oxidation state equal to 0 (zero); and
vi. F. Purity 99%

Wherein, said at least one quaternary ammonium of the multipurpose product with prolonged antimicrobial action is in a concentration of between 1-10,000 ppm (0.0001-1% w/v) and said copper nanoparticles in non-oxidized metallic state ($Cu^0$) are in a concentration between 0.001-100 ppm (0.0000001-0.01% w/v), preferably said at least one quaternary ammonium is in a concentration between 100-2000 ppm (0.01-0.2% w/v) and said copper nanoparticles in non-oxidized metallic state ($Cu^0$) are in a concentration between 1-10 ppm (0.0001-0.001% w/v).

The at least one quaternary ammonium is selected from sodium dodecyl sulfate, sodium lauryl sulfate, benzalkonium chloride, benzethonium chloride, N,N,N-trimethylhexadecane-1-aminium bromide, cetylpyridinium chloride, ketalkonium chloride, of N,N,N-trimethylhexadecane-1-aminium, methylbenzethonium chloride, didecyldimethylammonium chloride, tetraethylammonium bromide, cetylpyridinium chloride, and mixtures thereof.

The copper nanoparticles have a size between 0.5-5,000 nm, preferably said copper nanoparticles have a size between 0.5 and 5 nm.

In addition, there is a method for producing a multipurpose product with prolonged antimicrobial action, which includes:

a. preparing a solution of at least one reducing agent, mixing at least one reducing agent with water selected from osmosis, distilled, bidistilled, deionized, or type I or type II ultrapure water, to then adjust the pH between 5-10;

b. preparing a solution of at least one copper salt by mixing at least one copper salt with water selected from osmotized, distilled, bidistilled, deionized, or type I or type II ultrapure water;

c. preparing a solution of at least one quaternary ammonium, mix at least one quaternary ammonium with water selected from osmotized, distilled, bidistilled, deionized, or type I or type II ultrapure water;

d. mixing the solution of at least one copper salt with the solution of at least one quaternary ammonium;

e. passing the solution of at least one reducing agent prepared in stage (a) through a pipe (i) and pass the mixed solution obtained in stage (d) corresponding to the solution of at least one copper salt with the solution of at least one quaternary ammonium through a pipe (ii), until joining both pipes (i) and (ii) in a "Y" type structure to make a mixture;

f. putting the final mixture obtained in step (e) into a reactor where heat energy is applied with localized direction towards the reaction pipes, and keep the final mixture in the reactor for at least between 1-30 min; and g. storing the final mixture obtained in point (f) comprising at least one quaternary ammonium and copper nanoparticles in the non-oxidized metallic state ($Cu^0$), where the copper nanoparticles in the non-oxidized metallic state) ($Cu^0$) are nucleated in at least one quaternary ammonium.

In step (a) of the method, at least one reducing agent is selected from hydrazine, sodium borohydride, carboxylic acids, organic acids, carbohydrates, including lactic acid, formic acid, citric acid, oxalic acid, malic acid, benzoic acid, ascorbic acid, glucose, fructose maltose or mixtures thereof.

Furthermore, in step (a) of the method, the pH is adjusted with a buffer solution.

In step (b) of the method, the at least one copper salt is selected from copper (I) or (II) chloride, copper sulfate mono, di, tri or pentahydrate, copper acetate, copper oxide (I) or (II), copper sulfide, copper bromide, copper (I) hydroxide or (II), copper hydride, copper carbonate, 4,8-diacetyl-2,9a-dimethyl-7,9-dioxodibenzofuran-Copper 1,3-diolate (copper usnate) or mixtures thereof.

In step (c) of the method, at least one quaternary ammonium is selected from sodium dodecyl sulfate, sodium lauryl sulfate, benzalkonium chloride, benzethonium chloride, N,N,N-trimethylhexadecane-1-aminium bromide, chloride cetylpyridinium chloride, ketalkonium chloride, N,N,N-trimethylhexadecane-1-aminium chloride, methylbenzethonium chloride, didecyldimethylammonium chloride, tetraethylammonium bromide, cetylpyridinium chloride, or a mixture thereof.

In stage (f) of the method, the final mixture is preferably kept in the reactor for between 1-12 min.

Finally, the method for producing a multipurpose product with prolonged antimicrobial action comprises proportions of 1:1-1:100 by mass between at least one copper salt and the at least one reducing agent, preferably comprising proportions of 1:1-1:10 by mass between at least one copper salt and the at least one reducing agent.

EXAMPLES

To verify the effectiveness of the product of the invention, its bactericidal, virucidal, fungicidal and yeasticide action was evaluated, carrying out tests by independent organisms, and using products with different proportions of components ranging between 1-10,000 ppm (0.0001-1% w/v) of at least one quaternary ammonium and 0.001-100 ppm (0.0000001-0.01% w/v) of copper nanoparticles, among which it is possible to highlight:

INTA University of Chile:
CLSI Standard M26-A—Determination of Minimum Inhibitory Concentration (MIC) and determination of Minimum Bactericidal Concentration (MBC).
Strains Used:
  *Escherichia coli* ATCC 8739
  *Salmonella Enteritidis* ATCC 13076
  *Staphylococcus aureus* ATCC 6538
  *Lysteria monocytogenes* ATCC 19114
Result:
  No growth of colonies was observed after incubation with the product, therefore, the product eliminates more than 99.9% of the bacteria, corresponding to the maximum limit expressible by the method used, in concentrations>3% of the original product.

CETOX Peru:
Kelsey Method Sykes—Plate Culture and CFU Count.
Strains Used:
  *Escherichia coli* ATCC 25922
  *Staphylococcus aureus* ATCC 25923
  *Bacillus cereus*
  *Pseudomonas aeruginosa* ATCC 27853
  *Staphylococcus epidermis*
Result:
  The product used undiluted has full disinfectant activity, eliminating 100% of microorganisms from 5 minutes of application.

MERIEUX Laboratories, Italy:
The MERIEUX laboratory evaluated the product with two different standards.
BS EN 1276:2019 Standard
  Quantitative suspension test for the evaluation of the bactericidal activity of chemical disinfectants and antiseptics used in food, industrial, domestic and institutional areas.
BS EN 13697:2015+A1:2019 Standard
  Quantitative test on non-porous surfaces for the evaluation of the bactericidal activity of chemical disinfectants used in food, industrial, domestic and institutional areas.
Strains Used:
  *Staphylococcus aureus* ATCC 6538
  *Pseudomonas aeruginosa* ATCC 15442
  *Escherichia coli* K12 NCTC 10538
  *Lysteria monocytogenes* ATCC 35152
Result:
  The product eliminates more than 99.999% (>5 log reduction) of microorganisms on surfaces and in suspension from 5% of the product concentration.

EUROFINS, Belgium:
Method 07/11-12/05
Strains Used>
  *Salmonella* spp.
  *Listeria. monocytogenes*
Result:
  There is no presence of *Salmonella* spp or *Listeria monocytogenes* on the surfaces evaluated after washing with the product.

Quality Trust Laboratories, Chile:
  *Staphylococcus aureus* ATCC 25923
  *Pseudomonas aeruginosa* ATCC 27853
Result:
  The product provides antibacterial effectiveness and permanence of the >99.9999% bacterial elimination effect (>6 logarithms of reduction) on surfaces for at least 7 days from application with and without organic interference.

Tests were also carried out to determine its antiviral activity, also by independent organizations, among which the following stand out:

MERIEUX Laboratories, Italy:
UNI EN 14476+A2:2019 Standard—Quantitative suspension test for the evaluation of virucidal activity in the medical area
Strains Used:
  *Vacciniavirus*, strain Ankara, ATCC-VR-1508
  *Adenovirus* type 5, strain Adenoid, 75 ATCC VR-5
  *Murine norovirus* MNV, strain 599 Berlin Friedrich Loeffler Institute RVB-0651
  *Human coronavirus* 229E (HCo-229E), ATCC VR-740
Result:
  The product has antiviral activity against vacciniavirus murine adenovirus and norovirus eliminating 100% of the viral particles in all concentrations tested. According to the results and indications of the EN 14476+A2:2019 standard, it is possible to assert that the product has antiviral action against encapsulated viruses such as those of the coronavirus family, which includes SARS-CoV-2.

Additionally, tests were carried out to determine the antifungal activity of the product of the invention, where the following stand out:

INTA University of Chile:
CLSI Standard M26-A—Determination of Minimum Inhibitory Concentration (MIC) and determination of Minimum Bactericidal Concentration (MBC)
Strains Used:
  *Candida albicans* ATCC 90028
  *Aspergillus niger* ATCC 16404
Results:
  The product eliminates more than 99.9% of fungi and yeasts in concentrations>0.78%.

MERIEUX Laboratories, Italy:
The MERIEUX laboratory evaluated the product with two different standards.
BS EN 1650:2019 Standard
  Quantitative suspension test for the evaluation of the fungicidal activity of chemical disinfectants and antiseptics used in food, industrial, domestic and institutional areas.
BS EN 13697:2015+A1:2019 Standard Quantitative test on non-porous surfaces for the evaluation of the fungicidal activity of chemical disinfectants used in food, industrial, domestic and institutional areas.
Strains Used
*Candida albicans* ATCC 10231
Result:
The product removes more than 99.99% (>4 logarithms of reduction) on surfaces and suspension in concentrations from 5%.

Field tests were carried out using the disinfectant product on high-traffic surfaces inside public transport buses and on high-traffic surfaces in a shopping center.
AINTECH Laboratories
Field Trial on Public Transport Buses
Report 20200108 Evaluation of the antimicrobial capacity of public transport buses. ISO 18593 Standard—Microbiology of the food chain. Horizontal methods for surface sampling
Results
After seven days of normal circulation, a decrease in total microorganisms of up to >99% was obtained on the evaluated surfaces.
Field Test on Shopping Center Floors
Report 20200420 Evaluation of the antimicrobial effect on high-traffic surfaces in the Mall Plaza Egana shopping center. ISO 18593 Standard—Microbiology of the food chain. Horizontal methods for surface sampling
Results
After five days from the application of the product on high-traffic surfaces, a >99% decrease in total microorganisms was obtained.

The invention claimed is:

1. A multipurpose product with prolonged antimicrobial action, CHARACTERIZED in that comprises at least one quaternary ammonium and copper nanoparticles in the non-oxidized metallic state ($Cu^0$), where the copper nanoparticles in the non-oxidized metallic state ($Cu^0$) are nucleated in at least a quaternary ammonium.

2. The multipurpose product with prolonged antimicrobial action according to claim 1, CHARACTERIZED in that the nanoparticles comprise the following physicochemical properties:
   a. spherical morphology;
   b. size distribution of <0.3 polydispersity index (PDI);
   c. surface load of <50 milliVolts (mV);
   d. face centered cubic (FCC) Bravais lattice crystal structure;
   e. oxidation state equal to 0 (zero); and
   f. purity≥99%.

3. The multipurpose product with Amended) prolonged antimicrobial action according to claim 1, CHARACTERIZED in that said at least one quaternary ammonium is in a concentration of between 1-10,000 ppm (0.0001-1% w/v) and said copper nanoparticles in non-oxidized metallic state ($Cu^0$) are in a concentration between 0.001-100 ppm (0.0000001-0.01% w/v).

4. The multipurpose product with prolonged antimicrobial action according to claim 2, CHARACTERIZED in that said at least one quaternary ammonium is in a concentration between 100-2000 ppm (0.01-0.2% w/v) and said copper nanoparticles in non-oxidized metallic state ($Cu^0$) are in a concentration of between 1-10 ppm (0.0001-0.001% w/v).

5. The multipurpose product with prolonged antimicrobial action according to claim 1, CHARACTERIZED in that the at least one quaternary ammonium comprises at least one of sodium dodecyl sulfate, sodium lauryl sulfate, benzalkonium chloride, benzethonium chloride, N, N, N-trimethyl-hexadecane-1-aminium bromide, cetylpyridinium chloride, ketalkonium chloride, N, N, N-trimethylhexadecane-1-aminium chloride, methylbenzethonium chloride, didecyldimethylammonium chloride, tetraethylammonium bromide, or cetylpyridinium chloride.

6. The multipurpose product with prolonged antimicrobial action according to claim 1, CHARACTERIZED in that said copper nanoparticles have a size between 0.5-5,000 nm.

7. The multipurpose product with prolonged antimicrobial action according to claim 6, CHARACTERIZED in that said copper nanoparticles have a size between 0.5 and 5 nm.

8. A method for producing the multipurpose product with prolonged antimicrobial action according to claim 1, CHARACTERIZED in that it comprises:
   a. preparing a solution of at least one reducing agent, mixing at least one reducing agent with water selected from osmosis, distilled, bidistilled, deionized, or type I or type II ultrapure water, to then adjust the pH between 5-10;
   b. preparing a solution of at least one copper salt, mixing at least one copper salt with water selected from osmosis, distilled, bidistilled, deionized, or type I or type II ultrapure water;
   c. preparin a solution of at least one quaternary ammonium, mixing at least one quaternary ammonium with water selected from osmosis, distilled, bidistilled, deionized, or type I or type II ultrapure water;
   d. mixing the solution of at least one copper salt with the solution of at least one quaternary ammonium;
   e. passing the solution of at least one reducing agent prepared in stage (a) through a pipe (i) and pass the mixed solution obtained in stage (d) corresponding to the solution of at least one copper salt with the solution of at least one quaternary ammonium through a pipe (ii), until joining both pipes (i) and (ii) in a "Y" type structure to make a mixture;
   f. putting the final mixture obtained in step (e) into a reactor where heat energy is applied with localized direction towards the reaction pipes, and keep the final mixture in the reactor for at least 1-30 min; and
   g. storing the final mixture obtained in point (f).

9. The method for producing the multipurpose product with prolonged antimicrobial action according to claim 8, CHARACTERIZED in that in step (a) the at least one reducing agent selected from is hydrazine, sodium borohydride, carboxylic acids, organic acids, carbohydrates, among which they include lactic acid, formic acid, citric acid, oxalic acid, malic acid, benzoic acid, ascorbic acid, glucose, fructose maltose or mixtures thereof.

10. The method for producing the multipurpose product with prolonged antimicrobial action according to claim 8, CHARACTERIZED in that in step (a) the pH is adjusted with a buffer solution.

11. The method for producing the multipurpose product with prolonged antimicrobial action according to claim 8, CHARACTERIZED in that in step (b) the at least one copper salt is selected from copper chloride (I) or (II), copper sulfate mono, di, tri or pentahydrate, copper acetate, copper (I) or (II) oxide, copper sulfide, copper bromide, copper (I) or (II) copper hydroxide, copper hydride, copper carbonate, 4,8-diacetyl-2,9a-dimethyl Copper-7,9-dioxodibenzofuran-1,3-diolate (copper usnate) or mixtures thereof.

12. The method for producing the multipurpose product with prolonged antimicrobial action according to claim 8, CHARACTERIZED in that in step (c) the at least one quaternary ammonium is selected from sodium dodecyl sulfate, sodium lauryl sulfate, benzalkonium chloride, chloride benzethonium, N, N, N-trimethylhexadecane-1-aminium bromide, cetylpyridinium chloride, ketalkonium chloride, N, N, N-trimethylhexadecane-1-aminium chloride, methylbenzethonium chloride, didecyldimethylammonium chloride, tetraethylammonium bromide, cetylpyridinium chloride or a mixture thereof.

13. The method for producing the multipurpose product with prolonged antimicrobial action according to claim 8, CHARACTERIZED in that in stage (f) the final mixture is preferably kept in the reactor for between 1-12 min.

14. The method for producing the multipurpose product with prolonged antimicrobial action according to claim 8, CHARACTERIZED in that it comprises proportions of 1:1-1:100 by mass between the at least one copper salt and the at least one reducing agent.

15. The method for producing the multipurpose product with prolonged antimicrobial action according to claim 14, CHARACTERIZED in that it comprises proportions of 1:1-1:10 by mass between the at least one copper salt and the at least one reducing agent.

* * * * *